Dec. 19, 1922.

H. H. TALBOT.
ROLLING MILL DRIVE.
FILED JUNE 21, 1921.

INVENTOR.
Howard H. Talbot
by C. M. Clarke
Attorney

Patented Dec. 19, 1922.

1,439,341

UNITED STATES PATENT OFFICE.

HOWARD H. TALBOT, OF WOOSTER, OHIO, ASSIGNOR, BY MESNE ASSIGNMENTS, TO MACKINTOSH-HEMPHILL COMPANY, OF PITTSBURGH, PENNSYLVANIA, A CORPORATION OF PENNSYLVANIA.

ROLLING-MILL DRIVE.

Application filed June 21, 1921. Serial No. 479,211.

*To all whom it may concern:*

Be it known that I, HOWARD H. TALBOT, a citizen of the United States, residing at Wooster, in the county of Wayne and State of Ohio, have invented certain new and useful Improvement in Rolling-Mill Drives, of which the following is a specification.

My invention relates to an improvement in means for taking up the thrust of the drive shaft or shafts of a continuous rolling mill in which the roll shafts are geared through bevel gearing.

In such installations, there is a constant tendency between the intermeshing bevel teeth to separate under driving strains, due to reaction of the teeth. In ordinary practice, this is resisted by the faces of the gear hubs engaging the ends of the bearing shells of the shaft bearings, but such practice involves difficulty in distributing the wear evenly over a number of bearings, resulting in excessive load against one or more of the bearing shells, causing excessive wear and heating. A further objection is that, due to the excessive wear, the gears are not maintained in proper mesh.

In my invention I provide thrust bearings at the end portion of the drive shaft or shafts, so constructed as to efficiently absorb the thrust, thereby relieving the several journal bearings and their shells, and properly retaining the several bevel gears in mesh. These thrust bearings are adjustable for taking up wear and reducing the friction losses to a minimum, and are furthermore easily accessible for adjustment, repair, or renewal.

In the drawings, showing one manner of utilizing the invention,

Figure 1:
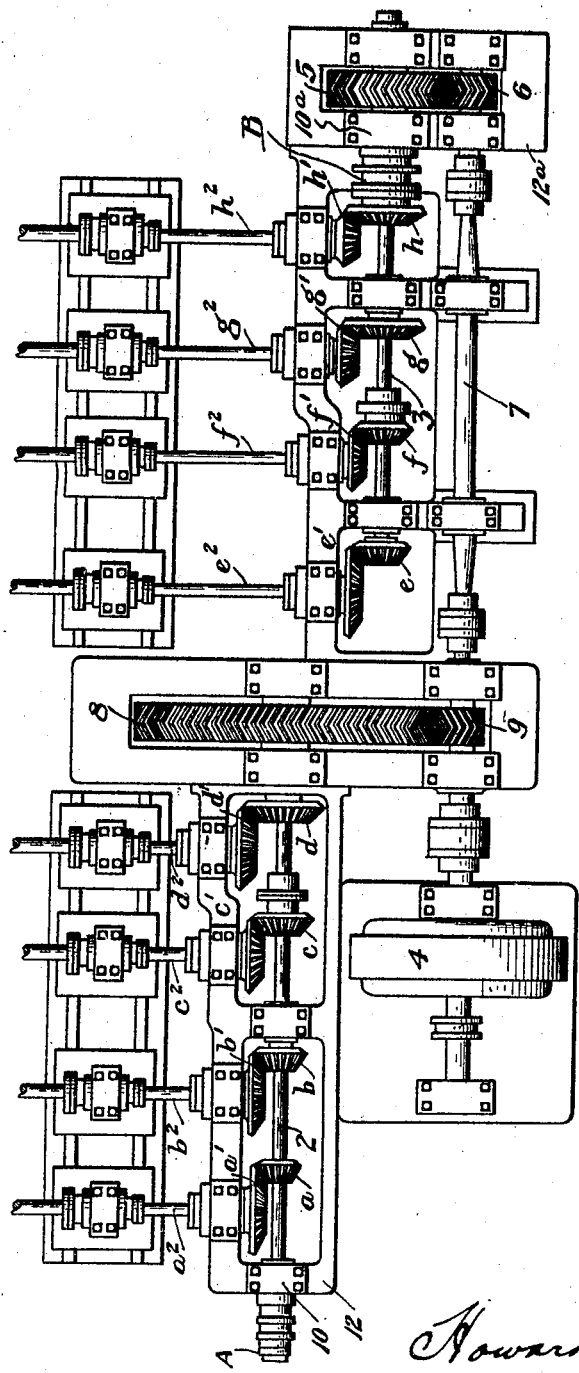
Fig. 1 is a plan view, somewhat diagrammatical, of a continuous rolling mill provided with the thrust bearings at the ends of each main drive shaft.
Figure 2:
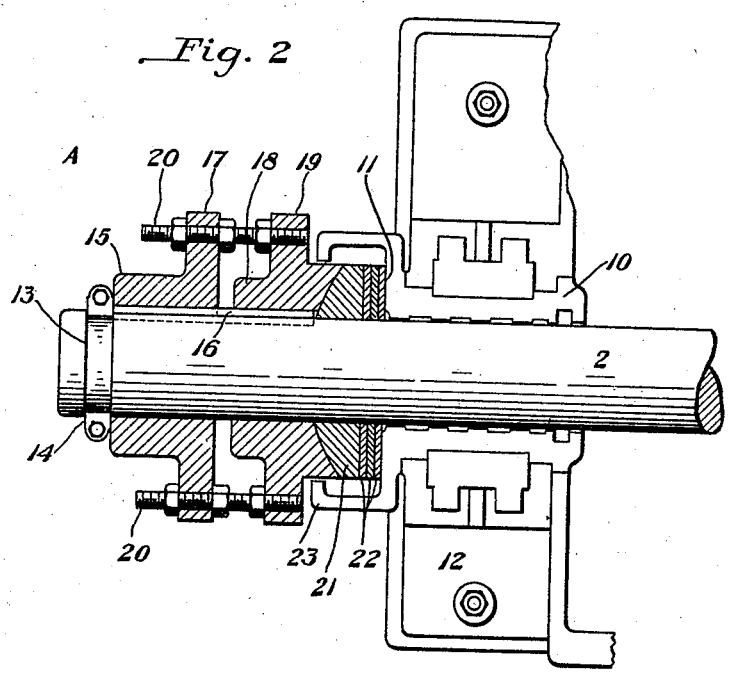
Figs. 2 and 3 are detail sectional views, enlarged, showing the construction of the thrust bearings, as used for each main drive shaft.
Figure 3:
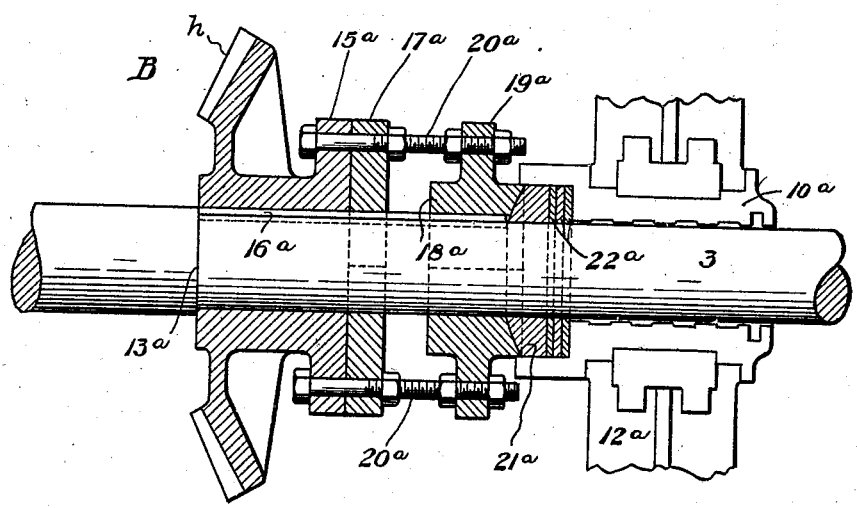

The power equipment of the mill utilizes two main driving shafts 2 and 3 respectively, of relatively low and high speed, shaft 3 being connected with the driving motor 4 through its gear wheel 5 and pinion 6 of shaft 7 connected directly with the motor, and arranged to transmit power to the finishing train of rolls through the interposed bevel gearing, at accelerating speeds. Shaft 2 is geared with the motor shaft through its gear 8 and motor pinion 9.

Shaft 2 transmits power to the primary train of rolls through the interposed bevel gearing, at accelerating lower speeds, as will be readily understood by those familiar with the art.

Thus, shaft 2 is geared through pairs of bevels $a, a'$; $b, b'$; $c, c'$; and $d, d'$, with the several drive shafts $a^2, b^2, c^2$ and $d^2$ of corresponding stands of rolls of the mill, not shown.

In a similar manner, shaft 3, of higher speed, transmits power to the secondary or finishing train of rolls through the interposed bevel gearing, at accelerating higher speeds. Thus, shaft 3 is geared through pairs of bevels $e, e'$; $f, f'$; $g, g'$ and $h, h'$; with the several drive shafts $e^2, f^2, g^2$ and $h^2$ of corresponding stands of rolls of the mill, not shown.

The thrust bearing for shaft 2 is generally indicated in Fig. 1 by the letter A, and is at the outermost tail end of the shaft, acting to restrain the inward thrust, due to the intermeshing bevel gears. Thrust bearing B for shaft 3 is located near its driving end in the rear of the last driving bevel $h$ and directly opposes the backward thrust of the shaft to maintain the proper relation of the gears and the shaft in its bearings. For the purpose of easy insertion or removal without removing the gears, the parts of thrust bearing B are made in halves. In each case the thrust bearing A and B is located just beyond and in opposing operative relation to the shell of a pillow block or other suitable journal bearing 10 and $10^a$.

By this arrangement, shaft 2 is in tension relation to thrust bearing A and shaft 3 is in compression relation to thrust bearing B. The thrust bearings, per se, are generally similar in construction to others in common use, and I do not claim any novelty in their general principle of operation or construction, except in combination with an installation of the kind involved. They are made and adapted to operate as follows:

Referring to the bearing A, the opposing face of journal bearing or pillow block 10 for shaft 2 is provided with an ample bearing face 11 for receiving or opposing the thrust and for transmitting it to the main foundation or bed plate 12. The outer end of shaft 2 is annularly recessed by a groove 13 in which is fitted a split collar 14, rotatable with the shaft and the thrust bearing members, whereby the shaft is restrained against endwise movement.

Collar 14 bears inwardly against the end of a hub 15 keyed to the shaft by feather key 16 and provided with an annular flange 17. A co-acting hub 18 slidably mounted on the shaft and also keyed thereto for rotation has a similar flange 19, and the hubs 15 and 18 are connected for longitudinal adjustment by bolts 20 and securing nuts, as shown.

The inner face of hub 18 is spherically concaved and bears against the spherically convex face of a washer 21. Between it and the end of the shell of journal bearing 10 are a series of bronze and iron washers 22.

A surrounding coping 23 of bearing 10 extends over the washers and encloses them, as shown. In operation, inward tension and pull of shaft 2 is continuously resisted by the thrust bearing A, and is transmitted through the several gears to the shaft and thence through ring 14 and the adjusting hubs 15—18 to the assembled washers which absorb the rotative friction and eventually transmit the thrust against the resisting journal bearing 10.

The other thrust bearing B is generally similar to the one just described, except that it opposes the thrust of the shaft 3 and its gears from the opposite end.

The opposing face of journal bearing or pillow block 10ª is similar to that of bearing 10 and transmits the pressure to the base 12ª. The last driving bevel gear is in shouldered engagement with the shaft 3, as at 13ª, and bevel $h$ is keyed to the shaft by spline 16ª. It has a special hub construction provided with a flange 15ª and a supplemental two-part flange 17ª secured by bolts 20ª and their adjusting nuts. The co-acting two-part hub 18ª slidably mounted and keyed is also adjustably connected by its flange 19ª by bolts 20ª and the nuts, in the same manner already described.

Inner face of hub 18ª is spherically concaved and bears against the spherically concaved face of washer 21ª, and between it and the end of the shell of journal bearing 10ª are the series of bronze and iron washers 22ª. The operation in continuously resisting the rearward thrust of shaft 3, whereby to maintain the several driving bevel gears in operative relation to the driven bevels is generally the same as already described.

It will be observed that in the arrangement of the mill and its gearing, utilizing the two main drive shafts 2 and 3, geared with the prime mover, and each with its set of roll shafts through the pairs of bevels, each shaft 2 and 3 is subject to a thrust independent of the other.

The location of each thrust bearing, and its mounting with relation to the several other parts and driving gears of its shaft, provide for and ensure resistance to the thrust of all of the gears of each particular shaft. Also, that by locating the thrust bearings in the manner shown, each is capable of adjustment and function with relation to its particular shaft, permitting the strains to be distributed and absorbed at locations convenient and accessible for adjustment, etc.

The presence of the thrust bearings incorporated in the power transmitting installation in the manner shown greatly contributes to ease and economy of operation, reduction of friction losses, maintenance of proper driving engagement between the bevel gears, and general efficiency of the mill and its power equipment as a whole.

What I claim is:

1. In a continuous metal rolling mill utilizing a driving shaft and pairs of bevels connecting it with a series of roll shafts, and a journal bearing for the driving shaft; a thrust bearing of the class described interposed between the journal bearing and a resisting abutment on the shaft.

2. In a continuous metal rolling mill utilizing a driving shaft and pairs of bevels connecting it with a series of roll shafts, and a journal bearing for the driving shaft; a thrust bearing of the class described comprising a shaft engaging abutment rotatable with the shaft, a relatively adjustable bearing abutment also rotatable with the shaft, and a series of bearing washers interposed between said abutment and the journal bearing.

3. In a continuous metal rolling mill utilizing a driving shaft and pairs of bevels connecting it with a series of roll shafts, and a journal bearing for the driving shaft; the combination therewith of a thrust bearing located near the end of the shaft beyond all of said bevels having bearing engagement with an abutment on the shaft and opposing bearing engagement with an adjacent journal bearing and embodying adjusting mechanism for varying the longitudinal location of the shaft.

4. In a continuous rolling mill, a series of primary rolls and a series of secondary rolls each having a driving shaft provided with a driven bevel wheel, a main driving shaft for each series each having a corresponding driving bevel wheel, and means for driving each of said shafts together; a thrust bearing for each main driving shaft interposed between a rotatable abutment on the shaft and an adjacent journal bearing near the end of each shaft.

5. In a continuous rolling mill, a series of primary rolls and a series of secondary rolls each having a driving shaft provided with a driven bevel wheel, a main driving shaft for each series each having a corresponding driving bevel wheel, and means for driving each of said shafts together; a thrust bearing for each main driving shaft interposed between a rotatable abutment on the shaft and an adjacent journal bearing near the end of each shaft and embodying means for effecting relative longitudinal adjustment of each shaft.

In testimony whereof I hereunto affix my signature.

HOWARD H. TALBOT.